(12) United States Patent
Xia et al.

(10) Patent No.: US 11,036,366 B2
(45) Date of Patent: Jun. 15, 2021

(54) INTERFACE DISPLAY METHOD AND DEVICE FOR HIBOARD, AND STORAGE MEDIUM

(71) Applicant: BEIJING XIAOMI MOBILE SOFTWARE CO., LTD., Beijing (CN)

(72) Inventors: Yuhang Xia, Beijing (CN); Haichen Cui, Beijing (CN); Xiang Meng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 5 days.

(21) Appl. No.: 16/699,562

(22) Filed: Nov. 30, 2019

(65) Prior Publication Data

US 2021/0011584 A1    Jan. 14, 2021

(30) Foreign Application Priority Data

Jul. 9, 2019    (CN) .......................... 201910615919.4

(51) Int. Cl.
*G06F 3/0483* (2013.01)
*H04M 1/724* (2021.01)
(Continued)

(52) U.S. Cl.
CPC .......... *G06F 3/0483* (2013.01); *G06F 3/0481* (2013.01); *G06F 3/0482* (2013.01);
(Continued)

(58) Field of Classification Search
CPC ................. G06F 3/0481; G06F 3/0485; G06F 2203/04803; G06F 3/0483; G06F 3/0482;
(Continued)

(56) References Cited

U.S. PATENT DOCUMENTS

| 7,546,543 B2 * | 6/2009 | Louch ...................... G06F 8/38 715/762 |
| 2010/0211568 A1 * | 8/2010 | Chu .................... G06F 16/9535 707/732 |

(Continued)

FOREIGN PATENT DOCUMENTS

| CN | 109691072 A | 4/2019 |
| CN | 109976861 A | 7/2019 |

(Continued)

OTHER PUBLICATIONS

JR Raphael, The Google Feed has lost its soul, https://www.computerworld.com/article/3229933/google-feed.html, Oct. 3, 2017 (Year: 2017).*

Extended European Search Report in Application No. 20175009, dated Oct. 23, 2020.

*Primary Examiner* — Nicholas Ulrich
(74) *Attorney, Agent, or Firm* — Syncoda LLC; Feng Ma

(57) ABSTRACT

An interface display method for a hiboard having a top display area and a dynamic message display area can include: displaying state information of a terminal on the dynamic message display area; displaying associated information of the state information on the top display area according to the state information; updating the associated information when the state information is updated; and displaying preset information on the top display area when the state information is not updated within a preset time.

20 Claims, 4 Drawing Sheets

(51) Int. Cl.
*G06F 3/0481* (2013.01)
*G06F 3/0485* (2013.01)
*G06F 3/0482* (2013.01)
*G06F 9/451* (2018.01)
*H04M 1/72451* (2021.01)
*H04M 1/72454* (2021.01)
*H04M 1/72457* (2021.01)

(52) U.S. Cl.
CPC ............ *G06F 3/0485* (2013.01); *G06F 9/451* (2018.02); *H04M 1/724* (2021.01); *H04M 1/72451* (2021.01); *H04M 1/72454* (2021.01); *H04M 1/72457* (2021.01); *G06F 2203/04803* (2013.01)

(58) Field of Classification Search
CPC .. G06F 3/0484; G06F 9/451; H04M 1/72519; H04M 1/724; H04M 1/72451; H04M 1/72457; H04M 1/72454
See application file for complete search history.

(56) References Cited

U.S. PATENT DOCUMENTS

| | | | |
|---|---|---|---|
| 2014/0052615 A1* | 2/2014 | Andersen | G06Q 30/0641 705/39 |
| 2017/0046024 A1* | 2/2017 | Dascola | G06F 3/04845 |
| 2017/0134474 A1* | 5/2017 | Gao | H04L 67/325 |
| 2018/0032484 A1* | 2/2018 | Feng | H04L 51/32 |
| 2018/0165105 A1* | 6/2018 | Lu | G06F 9/451 |
| 2018/0165634 A1* | 6/2018 | Kang | G06Q 10/08 |
| 2018/0341568 A1* | 11/2018 | Liu | G06F 16/80 |
| 2018/0342019 A1* | 11/2018 | Yang | G06Q 40/12 |
| 2019/0230215 A1* | 7/2019 | Zhu | G06Q 10/10 |

FOREIGN PATENT DOCUMENTS

| | | |
|---|---|---|
| EP | 3509282 A1 | 7/2019 |
| EP | 3716030 A1 | 9/2020 |

* cited by examiner

INTERFACE DISPLAY METHOD AND DEVICE FOR HIBOARD, AND STORAGE MEDIUM

CROSS-REFERENCE TO RELATED APPLICATION

This application claims priority to Chinese Patent Application No. 201910615919.4 filed on Jul. 9, 2019, the disclosure of which is hereby incorporated by reference in its entirety.

BACKGROUND

Typically, the leftmost screen of a mobile desktop is displayed as a hiboard, and content in the hiboard is mostly displayed in a form of card, with specific functions including common applications, step number, weather information, to-dos, word learning, and plentiful services provided by third-party service providers. The hiboard can provide users with services such as search, application recommendations, shortcut services, and situational intelligence.

It can be seen that the hiboard combines various services and functions, so that these messy functions are put together to provide users with a unified interface, which greatly simplifies operation.

SUMMARY

The present disclosure relates to a hiboard technology of a mobile terminal, and in particular, to an interface display method and device for a hiboard, and storage medium.

According to a first aspect of embodiments of the present disclosure, there is provided an interface display method for hiboard at least including a top display area and a dynamic message display area. The method includes: displaying state information of a terminal on the dynamic message display area; displaying associated information of the state information on the top display area according to the state information; updating the associated information when the state information is updated; and displaying preset information on the top display area when the state information is not updated within a preset time.

In some embodiments, in the foregoing method, the associated information of the state information includes one or more of: a copy prompt description corresponding to the state information; a prompt description for a service associated with the state information; and a shortcut function associated with the state information.

In some embodiments, in the foregoing method, the state information at least includes one or more of: service information, service state information, all associated service information in current scenario, and all associated service state information in the current scenario.

In some embodiments, in the foregoing method, the displaying associated information of the state information on the top display area includes: when the state information includes multiple pieces of state information, displaying the associated information of all the multiple pieces of state information on the top display area in a preset manner. The preset manner includes any one of: preferentially displaying the associated information of a piece of state information with highest priority of the multiple pieces of the state information, and displaying the associated information of remaining pieces of state information in a scrolling manner; preferentially displaying the associated information of the piece of state information with the highest priority of the multiple pieces of the state information, and secondarily displaying the associated information of a specified piece of state information of the remaining pieces of state information; and displaying only the associated information of the piece of state information with the highest priority of the multiple pieces of the state information.

In some embodiments, in the foregoing method, the state information of the terminal displayed on the dynamic message display area includes one piece of state information or multiple pieces of state information. When the state information includes the multiple pieces of state information, the displaying the state information of the terminal on the dynamic message display area includes: sequentially displaying all of the multiple pieces of state information on the dynamic message display area according to priorities of the multiple pieces of state information.

According to a second aspect of embodiments of the present disclosure, there is provided an interface display device for hiboard, including: a dynamic update module, configured to display state information of a terminal on a dynamic message display area of the hiboard; and a dynamic prompt module, configured to display associated information of the state information on a top display area of the hiboard according to the state information, update the associated information when the state information is updated, and display preset information on the top display area of the hiboard when the state information is not updated within a preset time.

In some embodiments, in the foregoing device, the associated information of the state information includes one or more of: a copy prompt description corresponding to the state information; a prompt description for a service associated with the state information; and a shortcut function associated with the state information.

In some embodiments, in the foregoing device, the state information at least includes one or more of: service information, service state information, all associated service information in a current scenario, and all associated service state information in the current scenario.

In some embodiments, in the foregoing device, displaying, by the dynamic prompt module, the associated information of the state information on the top display area includes: when the state information includes multiple pieces of state information, displaying the associated information of all the multiple pieces of state information on the top display area in a preset manner. The preset manner includes any one of: preferentially displaying the associated information of a piece of state information with highest priority of the multiple pieces of the state information, and displaying the associated information of remaining pieces of state information in a scrolling manner; preferentially displaying the associated information of the piece of state information with the highest priority of the multiple pieces of the state information, and secondarily displaying the associated information of a specified piece of state information of the remaining pieces of state information; and displaying only the associated information of the piece of state information with the highest priority of the multiple pieces of the state information.

In some embodiments, in the foregoing device, the state information of the terminal displayed on the dynamic message display area by the dynamic update module includes one piece of state information or multiple pieces of state information. When the state information includes the multiple pieces of state information, all of the multiple pieces of state information are sequentially displayed on the dynamic message display area according to priorities of the multiple pieces of state information.

According to a third aspect of embodiments of the present disclosure, there is provided an interface display device for hiboard, including: a processor; and a memory for storing instructions executable by the processor. The processor is configured to: display state information of a terminal on a dynamic message display area of the hiboard; display associated information of the state information on a top display area of the hiboard according to the state information; update the associated information when the state information is updated; and display preset information on the top display area when the state information is not updated within a preset time.

According to a fourth aspect of embodiments of the present disclosure, there is provided a non-transitory computer readable storage medium. When an instruction in the storage medium is executed by a processor of a mobile terminal, the mobile terminal performs an interface display method for a hiboard including: displaying state information of the terminal on a dynamic message display area of the hiboard; displaying associated information of the state information on a top display area of the hiboard according to the state information; and updating the associated information when the state information is updated; and displaying preset information on the top display area when the state information is not updated within a preset time.

It should be noted that the above general description and the following detailed description are merely exemplary and explanatory and should not be construed as limiting of the present disclosure.

BRIEF DESCRIPTION OF THE DRAWINGS

The accompanying drawings, which are incorporated into the specification and constitute a part of the disclosure, show exemplary embodiments of the present disclosure. The drawings along with the specification explain the principles of the present disclosure.

DETAILED DESCRIPTION

Figure 1:
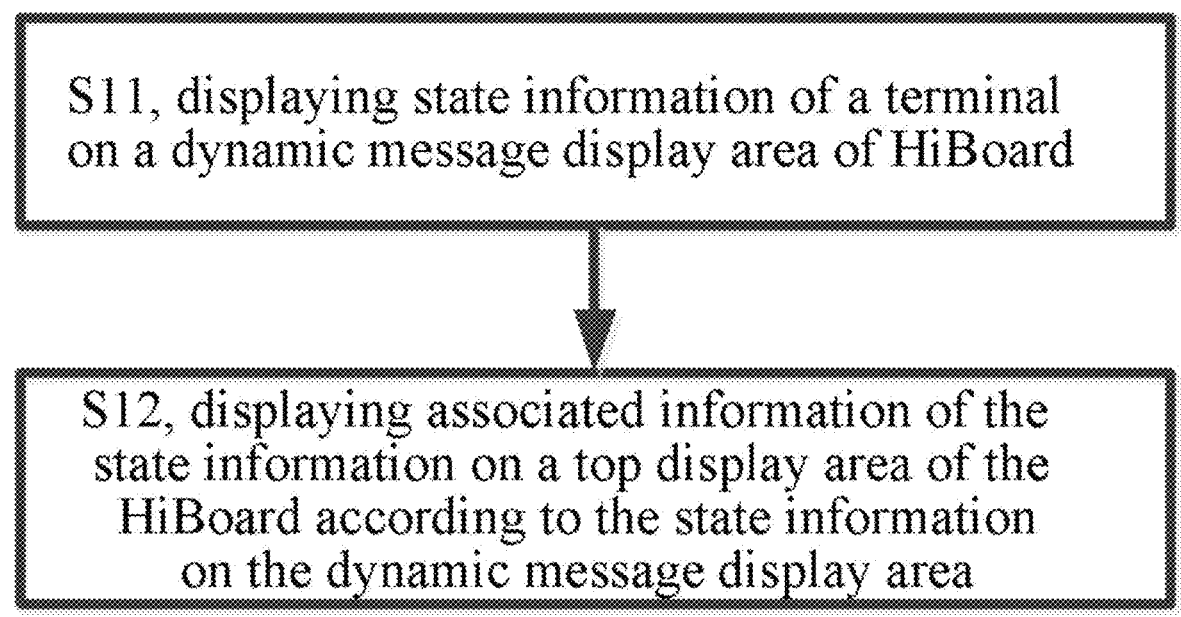
FIG. 1 is a flowchart showing an interface display method for hiboard according to an exemplary embodiment.

Exemplary embodiments will be described in detail herein, examples of which are illustrated in the accompanying drawings. When the accompanying drawings are described below, the same reference numerals refer to the same or similar elements in different figures unless indicated otherwise. The embodiments described in the following exemplary embodiments do not represent all embodiments consistent with the present disclosure. Instead, they are merely examples of devices and methods consistent with aspects of the present invention as recited in the appended claims.

FIG. 1 is a flowchart showing an interface display method for hiboard according to an exemplary embodiment. As shown in FIG. 1, the method may be used in a terminal, including the following steps.

In step S11, state information of a terminal is displayed on a dynamic message display area of the hiboard.

In this step, the state information of the terminal may include various service information, various service state information, all associated service information in a current scenario, and all associated service state information in the current scenario. For example, the state information of the terminal may include a travel service, various states of the travel service, and services associated with the travel service (such as ticket information).

In this example, the state information of the terminal displayed on the dynamic message display area of the hiboard may be obtained from the server side. For example, data source of all services informs the server side of the current service state, and the server side obtains different service states, and grades all services for ranking according to urgencies of matters (i.e., the emergency procedure of the service), scene attribute, and time sequence in which service events occur. The service with high score is ranked high (that is, the priority of the state information of the terminal is determined, where the priority of the state information can be directly proportional to the ranking, and the higher the priority, the higher the ranking is, and the priority of the state information can be determined by the server side regardless of the mobile terminal side). After that, the server side will package the ranking based on the scores and the service and return it to the client terminal. The client terminal can display the state information of the terminal on the dynamic message display area according to the received ranking and service. The dynamic message display area may be a display area separately divided on the hiboard, or an existing display area may be reused as the dynamic message display area.

In addition, the server side may also confirm whether the current service (equivalent to the state information of the terminal displayed on the dynamic message display area) is associated with other service content. If the current service is associated with other service content, a service associated with the current service is returned to the client terminal for display.

In step S12, associated information of the state information is displayed on a top display area of the hiboard according to the state information on the dynamic message display area.

When the state information on the dynamic message display area is updated, the associated information on the top display area may be updated. When the state information is not updated within a preset time, preset information may be displayed on the top display area.

The top display area herein may be a display area separately divided at the top of the hiboard, or the top position of the hiboard may be reused as the top display area.

It can be seen from the above method steps that in the present exemplary embodiment, in the case where there are various services, when the user slides to the hiboard, the state information of the terminal (such as the current service dynamics) can be got by the user the first time without triggering, and the state of the terminal is illustrated and reminded to the user, that is, the user is reminded of things that the user needs to deal with at the moment or things that have been updated dynamically, thereby providing high product value and user value.

The associated information of the state information of the terminal displayed on the top display area herein may be in various forms, and may show the content of the current service in a simple and clear manner (i.e., for the state information of the terminal, abstract copy or associated content thereof is displayed on the top display area of the hiboard), so that the effect of reminding or explaining can be achieved. For example, the associated information of the state information may include one or more of a copy prompt description corresponding to the current state information of the terminal, a prompt description for a service associated with the current state information of the terminal, and a shortcut function associated with the current state information of the terminal.

By taking the state information of the terminal for travel as example, the specific content of the associated information displayed on the top display area is described below.

It is assumed that the state information of the terminal is for travel, corresponding travel reminder or arrival reminder may be provided according to different states of a travel card. Such prompt description may be considered as a copy prompt description corresponding to the current state of the terminal, belonging to one type of the associated information displayed on the top display area.

It is also possible to indicate temperature and traffic conditions of travel destination based on weather card, commuter card, etc. associated with the travel card. Such prompt description may be regarded as a prompt description of the service associated with the current state of the terminal, belonging to another type of associated information displayed on the top display area.

It may also be based on some gadgets associated with the travel card, such as clock display of the travel destination, currency exchange rate display, etc. Such display prompt may be considered as a shortcut function associated with the current state of the terminal, belonging to yet another type of associated information displayed on the top display area.

When the interface of the hiboard is displayed according to the above method, different contents may be displayed on different areas of the hiboard. For example, the hiboard may be set in advance to have three areas, a display area (referred to as a top display area in this example), a shortcut area (equivalent to a function card display area), and an update area (referred to as a bottom dynamic message display area in this example). For convenience of description, the above three areas are respectively disposed at the top, middle, and bottom of the hiboard, but in practical applications, it is not limited to division in such manner, and division in any other manner may be used.

The update area may dynamically display corresponding service, that is, display the state information of the terminal, according to current geographical location and time. Alternatively, all services may be graded for ranking according to urgencies of all services, scene attributes, and time points at which events occur, and then displayed on the update area according to the ranking. That is, the state information of the terminal displayed on the update area includes multiple pieces of information, which can be displayed on the update area according to priorities thereof. When the update area cannot display all the pieces of information of the state information, the information with lower ranking may be hid in a manner of folded window, or all the pieces of information of the state information may be dynamically displayed in a scrolling manner.

Figure 2:
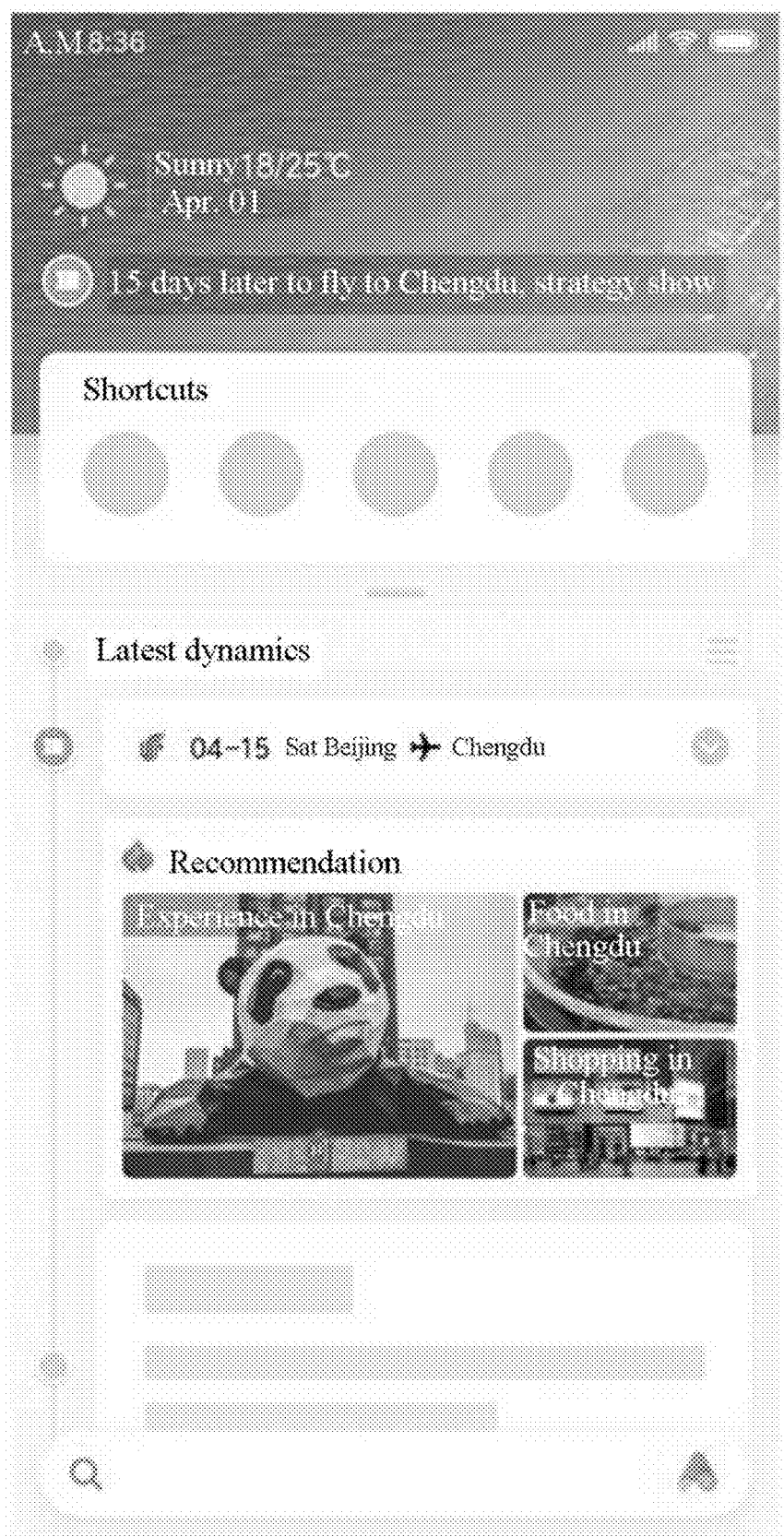
FIG. 2 is a schematic diagram showing a display interface for hiboard according to an exemplary embodiment.

The display area may preferentially display the associated information of the state information with the highest ranking on the dynamic message display area according to service change (that is, the update of the state information of the terminal) on the update area. The associated information of other state information on the dynamic message display area may be displayed on the top display area according to a preset manner. For example, the preset manner is in the form of scrolling display up and down, or the preset manner is that prompt descriptions for specified services are displayed in scrolling manner, etc. At this time, the display interface of the hiboard is as shown in FIG. 2. In addition, regardless of whether the state information of the terminal on the dynamic message display area includes one or more pieces of information, the top display area may be configured to display only the associated information of the state information with highest priority.

When there is no change in the update area, the display area may display some alternative copies according to current location of user and time. That is, if the state information of the terminal on the dynamic message display area is not updated within a preset time, and preset information may be displayed on the top display area.

Figure 3:
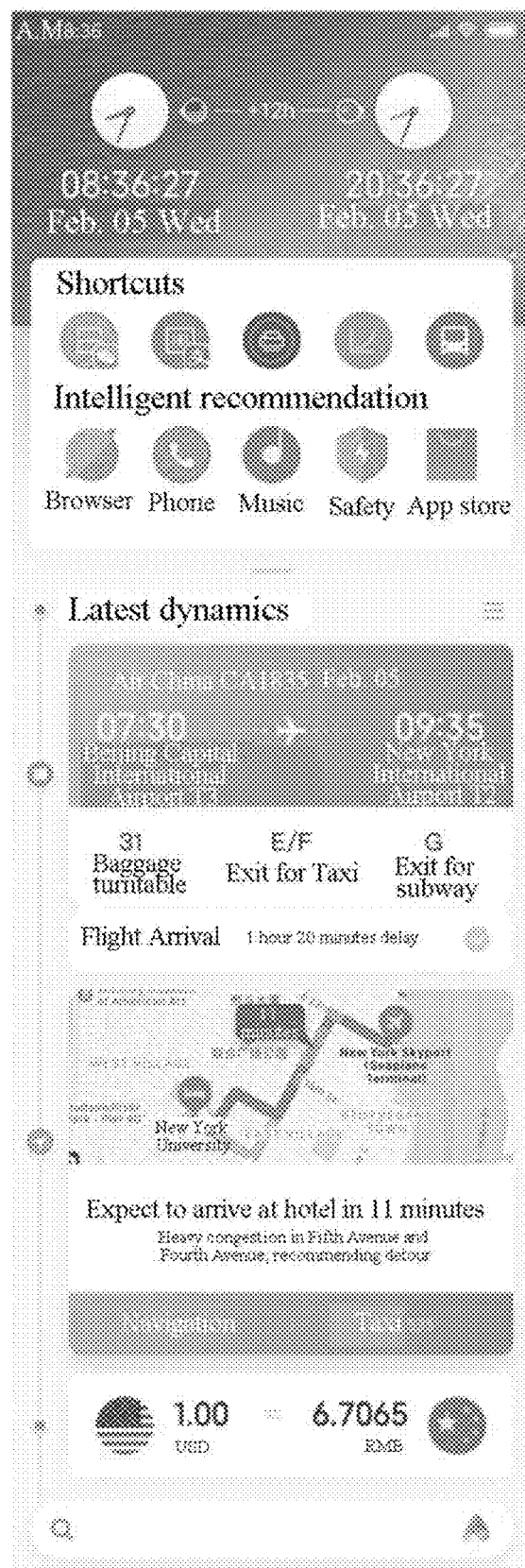
FIG. 3 is a schematic diagram showing another display interface for hiboard according to an exemplary embodiment.

For example, it can be seen from the display interface of the hiboard shown in FIG. 3 that the user has a flight after 4 hours, so the travel card has the highest urgency, and the travel scene attribute is P0. At this time, it is displayed in the first place of the update area. That is, in the state information of the terminal displayed on the dynamic message display area, the travel is placed first. At the same time, the user's current geographic location is obtained, and the navigation routes from the current location to the airport (i.e., the commute card, which is a card associated with the travel card) are present to the user, to recommend different transportation modes to the user. The user can see the commute card and the travel card on the update area at this time. That is, the state information of the terminal displayed on the dynamic message display area includes the commute information. On the display area, the user can see the associated information of the corresponding scene of "it's time to go to the airport and it will take 1 hour and 23 minutes for the whole journey" (not shown). When the user arrives at the destination, the card in the update area will show the baggage carousel number of the flight, the local weather, and the strategy recommendation, and will display "Welcome to New York" on the display area, and a dual clock (the dual clock displayed can be considered as a prompt description of the service associated with the current state of the terminal).

As can be seen from the above, the technical solution of the present embodiment can combine the capability of each CP, and package the services (including the current service and its associated services) required by the user in the entire scenario. While the services are displayed on the update area, the top display area also presents valuable associated information, such as promote information, to make the user more aware of what needs to be handled at that time. Moreover, the frequency of the user using the hiboard assistant is improved, and in comparison with the operation of the related art that numbers of Apps need to be opened, all the services in the embodiment can be integrated into the hiboard assistant for operating, which greatly reduces the operation of the user.

Figure 4:
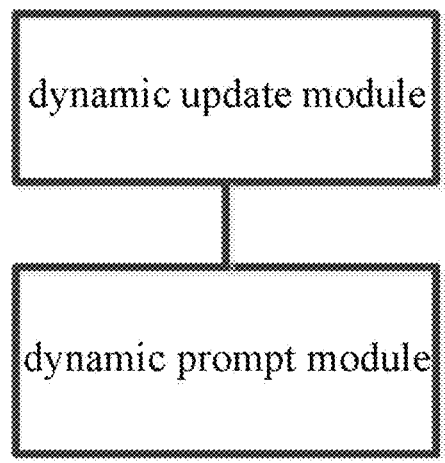
FIG. 4 is a structural block diagram showing an interface display device for hiboard according to an exemplary embodiment.

FIG. 4 is a structural block diagram showing an interface display device for a hiboard according to an exemplary embodiment, which may be built in a mobile terminal, or may be a separate device from the mobile terminal. The interface display device for hiboard may include a dynamic update module and a dynamic prompt module.

The dynamic update module is configured to display state information of a terminal on a dynamic message display area of the hiboard.

The dynamic prompt module is configured to display associated information of the state information on a top display area of the hiboard according to the state information, update the associated information when the state information is updated, and display preset information on the top display area when the state information is not updated within a preset time.

The associated information of the state information herein includes one or more of: a copy prompt description corresponding to the state information, a prompt description for a service associated with the state information, and a shortcut function associated with the state information.

The above two modules may display the state information of the terminal and dynamically display the associated information of the state information on different areas of the hiboard, respectively. The top display area and the dynamic message display area may be divided on the hiboard in advance. The top area of the hiboard may be reused as the top display area for displaying the associated information of the state information, and any area of the hiboard may be reused as the dynamic message display area for displaying the state information of the terminal.

The state information of the terminal may include service information of the terminal, service state information, all associated service information in the current scenario, and all associated service state information in the current scenario. For example, the dynamic message display area may display travel information of a flight, dynamically update the user's location according to time or place information, and display the weather, the strategy and the like of the corresponding position of the user travel destination.

The dynamic prompt module may be configured to display the associated information of the current service on the top display area. For example, the content of the top display area is updated according to the updated content of the dynamic message display area. When the user arrives, clocks of two regions may be displayed on the top display area.

With regard to the device in the above embodiments, the specific manner in which the respective modules perform the operations has been described in detail in the embodiment relating to the method, and will not be explained in detail herein.

An exemplary embodiment shows an interface display device for hiboard, which may include a processor and a memory. The memory may be used to store instructions such as an application executable by the processor. The processor is configured to execute instructions to perform the interface display method for hiboard.

The specific manner in which the above-described processor executes instructions has been described in detail in embodiments of the related method and will not be described in detail herein.

The present example provides a non-transitory computer readable storage medium. When an instruction in the storage medium is executed by a processor of a mobile terminal, the mobile terminal performs an interface display method for hiboard. The method includes: displaying state information of a terminal on a dynamic message display area of the hiboard; displaying associated information of the state information on a top display area of the hiboard according to the state information; updating the associated information when the state information is updated; and displaying preset information on the top display area when the state information is not updated within a preset time.

Various embodiments of the present disclosure can have one or more of the following advantages.

When a user slides to the hiboard, things that the user needs to deal with at the moment or the things that have been updated dynamically, of the various services, can be got by the user the first time without triggering, which can remind the user and contribute to user's decision-making, so that the hiboard can be used as an intelligence assistant of the mobile phone.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment.

A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An interface display method for hiboard at least comprising a top display area and a dynamic message display area, comprising:
   obtaining, from a server side, multiple pieces of state information of a terminal and priorities of the multiple pieces of state information determined by the server side;
   displaying, according to the priorities of the multiple pieces of state information, state information of the terminal on the dynamic message display area;
   displaying associated information of the state information on the top display area according to the state information;
   updating the associated information when the state information is updated; and
   displaying preset information on the top display area when the state information is not updated within a preset time.

2. The interface display method for hiboard according to claim 1, wherein the associated information of the state information comprises one or more of:
   a copy prompt description corresponding to the state information;
   a prompt description for a service associated with the state information; and
   a shortcut function associated with the state information.

3. The interface display method for hiboard according to claim 1, wherein the state information at least comprises one or more of:
   service information, service state information, all associated service information in current scenario, and all associated service state information in the current scenario.

4. The interface display method for hiboard according to claim 1, wherein the displaying associated information of the state information on the top display area comprises:
   when the state information comprises multiple pieces of state information, displaying the associated information of all the multiple pieces of state information on the top display area in a preset manner, wherein the preset manner comprises any one of:
   preferentially displaying the associated information of a piece of state information with highest priority of the multiple pieces of the state information, and displaying the associated information of remaining pieces of state information in a scrolling manner;
   preferentially displaying the associated information of the piece of state information with the highest priority of the multiple pieces of the state information, and secondarily displaying the associated information of a specified piece of state information of the remaining pieces of state information; and
   displaying only the associated information of the piece of state information with the highest priority of the multiple pieces of the state information.

5. The interface display method for hiboard according to claim 1, wherein the state information of the terminal displayed on the dynamic message display area comprises one piece of state information or multiple pieces of state information,
   when the state information comprises the multiple pieces of state information, the displaying, according to the priorities of the multiple pieces of state information, the state information of the terminal on the dynamic message display area comprises:
   sequentially displaying all of the multiple pieces of state information on the dynamic message display area according to the priorities of the multiple pieces of state information.

6. A mobile phone implementing the method of claim 1, the mobile phone comprising a display screen configured to display the hiboard, wherein the mobile phone is configured to, responsive to a user sliding to the hiboard, provide services to the user at a first time without triggering.

7. The mobile phone of claim 6, wherein the associated information of the state information comprises at least one of:
- a copy prompt description corresponding to the state information;
- a prompt description for a service associated with the state information; or
- a shortcut function associated with the state information.

8. The mobile phone of claim 7, wherein the state information comprises at least one of:
- service information, service state information, all associated service information in current scenario, or all associated service state information in the current scenario.

9. The mobile phone of claim 8, further comprising a processing circuit configured to implement operations of the method, wherein the displaying associated information of the state information on the top display area comprises:
- in a case that the state information comprises multiple pieces of state information, displaying the associated information of all the multiple pieces of state information on the top display area in a preset manner, wherein the preset manner comprises any one of:
- preferentially displaying the associated information of a piece of state information with highest priority of the multiple pieces of the state information, and displaying the associated information of remaining pieces of state information in a scrolling manner;
- preferentially displaying the associated information of the piece of state information with the highest priority of the multiple pieces of the state information, and secondarily displaying the associated information of a specified piece of state information of the remaining pieces of state information; and
- displaying only the associated information of the piece of state information with the highest priority of the multiple pieces of the state information.

10. The mobile phone of claim 9, wherein the state information of the terminal displayed on the dynamic message display area comprises one piece of state information or multiple pieces of state information, and
- in the case that the state information comprises the multiple pieces of state information, the displaying, according to the priorities of the multiple pieces of state information, the state information of the terminal on the dynamic message display area comprises:
- sequentially displaying all of the multiple pieces of state information on the dynamic message display area according to priorities of the multiple pieces of state information.

11. An interface display device for hiboard, comprising:
a processor;
memory for storing instructions executable by the processor;
wherein when the instructions are executed by the processor, an interface display method for hiboard is performed, and
wherein the method comprises:
- obtaining, from a server side, multiple pieces of state information of a terminal and priorities of the multiple pieces of state information determined by the server side;
- displaying, according to the priorities of the multiple pieces of state information, state information of the terminal on a dynamic message display area of the hiboard;
- display associated information of the state information on a top display area of the hiboard according to the state information;
- update the associated information when the state information is updated; and
- display preset information on the top display area when the state information is not updated within a preset time.

12. The interface display device for hiboard according to claim 11, wherein the associated information of the state information comprises one or more of:
- a copy prompt description corresponding to the state information;
- a prompt description for a service associated with the state information; and
- a shortcut function associated with the state information.

13. The interface display device for hiboard according to claim 11, wherein the state information at least comprises one or more of:
- service information, service state information, all associated service information in current scenario, and all associated service state information in the current scenario.

14. The interface display device for hiboard according to claim 11, wherein the displaying associated information of the state information on the top display area comprises:
- when the state information comprises multiple pieces of state information, displaying the associated information of all the multiple pieces of state information on the top display area in a preset manner, wherein the preset manner comprises any one of:
- preferentially displaying the associated information of a piece of state information with highest priority of the multiple pieces of the state information, and displaying the associated information of remaining pieces of state information in a scrolling manner;
- preferentially displaying the associated information of the piece of state information with the highest priority of the multiple pieces of the state information, and secondarily displaying the associated information of a specified piece of state information of the remaining pieces of state information; and
- displaying only the associated information of the piece of state information with the highest priority of the multiple pieces of the state information.

15. The interface display device for hiboard according to claim 11, wherein the state information of the terminal displayed on the dynamic message display area comprises one piece of state information or multiple pieces of state information,
- when the state information comprises the multiple pieces of state information, the displaying, according to the priorities of the multiple pieces of state information, the state information of the terminal on the dynamic message display area comprises:
- sequentially displaying all of the multiple pieces of state information on the dynamic message display area according to priorities of the multiple pieces of state information.

16. A non-transitory computer readable storage medium, when an instruction in the storage medium is executed by a processor of a mobile terminal, the mobile terminal performs an interface display method for a hiboard comprising:
- obtaining, from a server side, multiple pieces of state information of the mobile terminal and priorities of the multiple pieces of state information determined by the server side;

displaying, according to the priorities of the multiple pieces of state information, state information of the mobile terminal on a dynamic message display area of the hiboard;

displaying associated information of the state information on a top display area of the hiboard according to the state information; and updating the associated information when the state information is updated;

displaying preset information on the top display area when the state information is not updated within a preset time.

17. The non-transitory computer readable storage medium according to claim 16, wherein the associated information of the state information comprises one or more of:
   a copy prompt description corresponding to the state information;
   a prompt description for a service associated with the state information; and
   a shortcut function associated with the state information.

18. The non-transitory computer readable storage medium according to claim 16, wherein the state information at least comprises one or more of:
   service information, service state information, all associated service information in current scenario, and all associated service state information in the current scenario.

19. The non-transitory computer readable storage medium according to claim 16, wherein the displaying associated information of the state information on the top display area comprises:
   when the state information comprises multiple pieces of state information, displaying the associated information of all the multiple pieces of state information on the top display area in a preset manner, wherein the preset manner comprises any one of:
   preferentially displaying the associated information of a piece of state information with highest priority of the multiple pieces of the state information, and displaying the associated information of remaining pieces of state information in a scrolling manner;
   preferentially displaying the associated information of the piece of state information with the highest priority of the multiple pieces of the state information, and secondarily displaying the associated information of a specified piece of state information of the remaining pieces of state information; and
   displaying only the associated information of the piece of state information with the highest priority of the multiple pieces of the state information.

20. The non-transitory computer readable storage medium according to claim 16, wherein the state information of the terminal displayed on the dynamic message display area comprises one piece of state information or multiple pieces of state information,
   when the state information comprises the multiple pieces of state information, the displaying, according to the priorities of the multiple pieces of state information, the state information of the terminal on the dynamic message display area comprises:
   sequentially displaying all of the multiple pieces of state information on the dynamic message display area according to priorities of the multiple pieces of state information.

* * * * *